US008910161B2

(12) United States Patent
Litty et al.

(10) Patent No.: US 8,910,161 B2
(45) Date of Patent: Dec. 9, 2014

(54) SCAN SYSTEMS AND METHODS OF SCANNING VIRTUAL MACHINES

(75) Inventors: Lionel Litty, Mountain View, CA (US); Samuel Larsen, San Carlos, CA (US); Gilad Arie Wolff, San Francisco, CA (US); Marios Leventopoulos, Palo Alto, CA (US); James Kiryakoza, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 278 days.

(21) Appl. No.: 13/548,518

(22) Filed: Jul. 13, 2012

(65) Prior Publication Data

US 2014/0019962 A1     Jan. 16, 2014

(51) Int. Cl.
*G06F 9/455* (2006.01)

(52) U.S. Cl.
USPC ............................................................ 718/1

(58) Field of Classification Search
CPC .................................................. G06F 9/45533
USPC ............................................................ 718/1
See application file for complete search history.

(56) References Cited

U.S. PATENT DOCUMENTS

| 7,480,806 | B2 * | 1/2009 | Grawrock ...................... 713/189 |
| 7,711,117 | B1 * | 5/2010 | Rohrle et al. .................. 380/270 |
| 8,479,294 | B1 * | 7/2013 | Li et al. ............................ 726/24 |
| 2004/0025042 | A1 * | 2/2004 | Kouznetsov et al. .......... 713/200 |
| 2008/0098457 | A1 * | 4/2008 | Carter ................................ 726/2 |
| 2008/0184225 | A1 * | 7/2008 | Fitzgerald et al. ................ 718/1 |
| 2009/0019552 | A1 * | 1/2009 | McLaughlin et al. .......... 726/27 |
| 2011/0010483 | A1 * | 1/2011 | Liljeberg ........................... 711/6 |
| 2011/0047618 | A1 * | 2/2011 | Evans et al. ...................... 726/23 |
| 2011/0197280 | A1 * | 8/2011 | Young et al. ..................... 726/24 |
| 2011/0296502 | A1 * | 12/2011 | Peretti ................................ 726/4 |
| 2012/0089833 | A1 * | 4/2012 | Jirka et al. ...................... 713/168 |
| 2012/0233611 | A1 * | 9/2012 | Voccio .............................. 718/1 |
| 2012/0233668 | A1 * | 9/2012 | Leafe et al. ........................ 726/4 |
| 2013/0047265 | A1 * | 2/2013 | Radhakrishnan et al. ...... 726/28 |
| 2013/0117822 | A1 * | 5/2013 | Soulez ............................... 726/4 |

OTHER PUBLICATIONS

Tal Garfinkel and Mendel Rosenblum, 2005, When Virtual is Harder than Real: Security Challenges in Virtual Machine Based Computing Environments. In Proceedings of the 10th conference on Hot Topics in Operating Systems—vol. 10 (HOTOS'05).
Peter M. Chen, Brian D. Noble, "When Virtual is Better than Real", Proceedings of the 2001 Workshop on Hot Topics in Operating Systems (HotOS), May 2001.

* cited by examiner

*Primary Examiner* — Emerson Puente
*Assistant Examiner* — Charlie Sun (57) ABSTRACT

A method and a system scan a virtual machine (VM). The method stores a first copy of a scan token associated with a first scan operation within a VM and stores a second copy of the scan token in a database accessible by a management module. Upon restarting of the VM, a scan token in the restarted VM is compared with a scan token associated with the restarted VM in the database. The scan token in the restarted VM is current when the scan token in the restarted VM matches the scan token in the database. A first scan operation is resumed on the restarted VM when it is determined that the scan token in the restarted VM is current, and a new first scan operation of the restarted VM is initiated when it is determined that the scan token in the restarted VM is not current.

24 Claims, 3 Drawing Sheets

SCAN SYSTEMS AND METHODS OF SCANNING VIRTUAL MACHINES

BACKGROUND

Virtual machines (VMs) may be executed by a group, or "cluster," of host computing devices. Each VM creates an abstraction of physical computing resources, such as a processor and memory, of the host executing the VM and executes a "guest" operating system, which, in turn, executes one or more software applications. To the guest operating system and guest software applications, the abstracted resources may be functionally indistinguishable from actual physical resources.

At least some host computing devices are grouped together in one or more datacenters. The datacenters may be at least partially virtualized to facilitate the migration, maintenance, and recovery of applications and data between computing devices and datacenters.

An administrator of a datacenter may desire to perform one or more scans of data within the VMs to ensure that the data does not contain undesired elements. For example, the administrator may desire to scan the data to ensure that no viruses or spyware are present in the data. The administrator may also desire to scan the data to ensure that no personally identifiable or confidential information exists in the VMs.

The virtualization of the datacenters and the computing devices within the datacenters may create unexpected challenges for performing the scans of the VMs. For example, during normal operation of a datacenter, the VMs may be suspended and resumed at a later point in time, may have a state of the VMs be recorded (or "snapshotted") and may be restored to that state at a later point in time (or "rolled back"), and/or may be migrated from one host computing device to another host computing device. Accordingly, if a scan is initiated on a VM that is suspended and resumed, snapshotted and rolled back, and/or migrated, the scan may be interrupted after only a portion of the data has been scanned. The scan may need to be restarted and all the data, including the previously scanned data, is scanned. Rescanning previously scanned data adversely impacts an efficiency of the scan and/or the datacenter.

SUMMARY

According to a method and a system described herein, at least one virtual machine (VM) is scanned. The method stores a first copy of a scan token associated with a first scan operation within a VM upon initiation of the first scan operation of the VM. A second copy of the scan token is stored in a database accessible by a management module that executes on a separate computing device than the VM. The management module and the database maintain an association between an identity of the VM and the scan token. Upon restarting of the VM, a scan token in the restarted VM is compared with a scan token associated with the restarted VM in the database. The scan token in the restarted VM is determined to be current when the scan token in the restarted VM matches the scan token associated with the restarted VM in the database. A first scan operation associated with the scan token in the restarted VM is resumed when it is determined that the scan token in the restarted VM is current, and a new first scan operation of the restarted VM is initiated when it is determined that the scan token in the restarted VM is not current.

DETAILED DESCRIPTION

Figure 1:
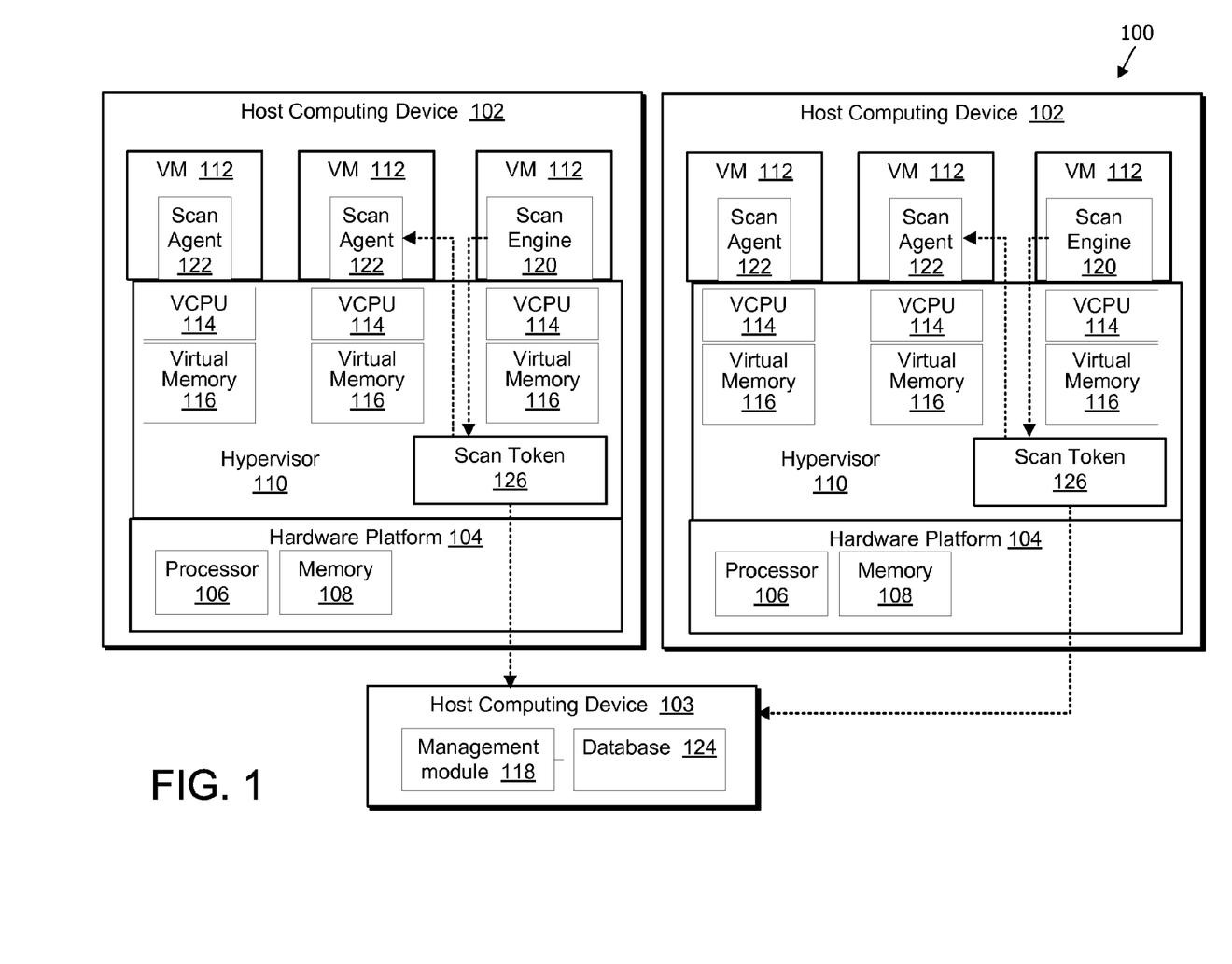
FIG. 1 is a block diagram of an exemplary scan system that may be used to scan a plurality of virtual machines (VMs).

FIG. 1 depicts a block diagram of a scan system 100 including a plurality of computing devices 102, which may be referred to as "hosts." Each computing device 102 includes a hardware platform 104, such as an x86 architecture platform. Hardware platform 104 includes at least one processor 106 and at least one memory 108. A virtualization layer, also referred to as hereinafter as a hypervisor 110, is installed on hardware platform 104.

The virtualization layer supports a virtual machine execution space (not shown) within which multiple virtual machines (VMs) 112 may be concurrently instantiated and executed. Hypervisor 110 maps physical resources of hardware platform 104 (e.g., processor 106 and memory 108) to virtual resources of a virtual hardware platform (not shown) associated with each VM 112. Accordingly, each VM 112 includes its own emulated or virtual hardware, such as at least one virtual processor 114 and at least one virtual memory 116.

Scan system 100 also includes a management module 118, included within a computing device or server 103. Server 103 may be similar to computing device 102 and includes at least hardware platform 104 (not shown). Scan system 100 also includes at least one scan engine 120, and at least one scan agent 122, both included within computing device 102. In an embodiment, management module 118 is a program module stored within server 103 and executable by processor 106 and/or a virtual processor (not shown) of server 103. Management module 118 controls and manages the operation of scan system 100, for example, by initiating a scan session that includes scan operations (also referred to herein as "scans") of VMs 112, and monitoring the progress of the scan session. In addition, management module 118 is in communication with each computing device 102 and each scan engine 120 of scan system 100.

Management module 118 may be coupled to a database 124 that is stored within a computer-readable storage medium of server 103. Alternatively, database 124 is stored remotely from server 103 and is accessible and/or connected to server 103 by a network (not shown). Database 124 stores a list of VMs 112 to be scanned and a status of the scan for each VM 112 (e.g., whether a scan for each VM 112 is in progress, has completed, and/or was canceled or interrupted).

Scan engine 120 is a program module that is stored within computing device 102 and is executable by virtual processor 114 of computing device 102. In the embodiment shown in FIG. 1, scan engine 120 is installed within a VM 112 that is separate from the VMs 112 being scanned. In an alternative embodiment, scan engine 120 may be installed within any other container, such as a virtualization layer as shown in FIG. 5 of U.S. Pat. No. 7,797,748 to Zheng et al., the contents of which are incorporated herein in their entirety. In an embodiment, each computing device 102 includes a single scan engine 120 that is in communication with each VM 112 of computing device 102. Scan engine 120 performs a scan of VMs 112 (i.e., of the data representative of VMs 112) within computing device 102 in response to receiving, from management module 118, a command to initiate the scan.

In addition, scan engine 120 generates a scan token 126 for each VM 112 being scanned (only one shown for each host).

Scan token 126 is used to identify a scan operation that will be performed on a VM 112 during the scan session. In an embodiment, each scan token 126 is a random number or a pseudorandom number that is unique within scan system 100. Scan engine 120 transmits scan token 126 to scan agent 122 and to database 124 (through management module 118, for example) when a scan operation is initiated for VM 112. A unique scan token 126 associated with each VM 112 is stored in database 124 and an association, such as a link or a table entry, is created between scan token 126 and VM 112 in the list of VMs 112 stored in database 124.

A separate scan agent 122 is associated with, and installed within, each VM 112 of scan system 100. Scan agent 122 is a program module that is executed by virtual processor(s) within the VM. Each scan agent 122 is in communication with scan engine 120 of computing device 102. Scan agent 122 transmits data of VM 112 (e.g., files and/or other data of VM 112) to scan engine 120 when scan engine 120 executes the scan operation.

During operation, management module 118 initiates a scan session for VMs 112. More specifically, management module 118 determines which VMs 112 are identified to be scanned and stores, within database 124, a list of VMs 112 that are identified to be scanned. It should be recognized that management module 118 may determine that not every VM 112 should be scanned. Accordingly, the list of VMs 112 to be scanned may represent a subset of all VMs 112 within computing devices 102 coupled to management module 118. In one embodiment, management module 118 generates a command for each scan engine 120 to initiate a scan operation on VMs 112 within computing device 102 associated with scan engine 120. Management module 118 transmits the command to each scan engine 120.

Scan engine 120 receives the command and enumerates and/or identifies VMs 112 that are "powered on" or are otherwise in an operational state within computing device 102. In an embodiment, scan engine 120 transmits a message to management module 118 to determine whether each identified VM 112 is to be scanned during the scan session. If VM 112 is to be scanned, scan engine 120 generates scan token 126 for VM 112 and transmits scan token 126 to scan agent 122 of VM 112 and to database 124. Scan token 126 is associated, within database 124, with VM 112 to facilitate maintaining a continuity of the scan operation if VM 112 is migrated, suspended and resumed, and/or restored to a previous state (also known as "rolled back"), as is described more fully herein.

Scan engine 120 commences the scan operation on VM 112 (i.e., on data and/or files of VM 112). The scan operation may include a virus scan of VM 112, a scan for personally identifiable and/or confidential information, a scan for security issues, and/or any other scan of VM 112. Scan agent 122 transmits data of VM 112 (e.g., files and/or other data of VM 112) to scan engine 120. Security issues scanned for include the presence of viruses, malware, Trojans, worms, or for data leak prevention such as detection of unauthorized data or information (e.g., personally identifiable information) that poses a security risk or otherwise should not be present. If the data exhibits an undesired aspect, scan engine 120 or scan agent 122 may automatically perform a predetermined corrective action on the data and/or may notify a user and/or an administrator. If the data does not exhibit undesired aspects, scan engine 120 continues the scan operation. In an embodiment, scan agent 122 stores a progress of the scan operation within VM 112 or within scan agent 122, such as an amount of data scanned, a most recent file scanned, and/or any other indicator of the progress of the scan operation.

When the scan operation has completed for a VM 112, scan engine 120 performs a scan operation on any remaining VMs 112 within computing device 102 that have been identified by management module 118 as requiring a scan. In one embodiment, scan engine 120 performs the scan operations sequentially or iteratively, i.e., on one VM 112 within computing device 102 at a time. Alternatively, scan engine 120 performs a plurality of scan operations in parallel, i.e., on a plurality of VMs 112 within computing device 102 at the same time. When the scan operation for each identified VM 112 has completed, scan engine 120 transmits a completion message to management module 118. When management module 118 receives a completion message from each scan engine 120 performing scan operations within scan system 100, management module 118 ends the scan session.

Figure 2:
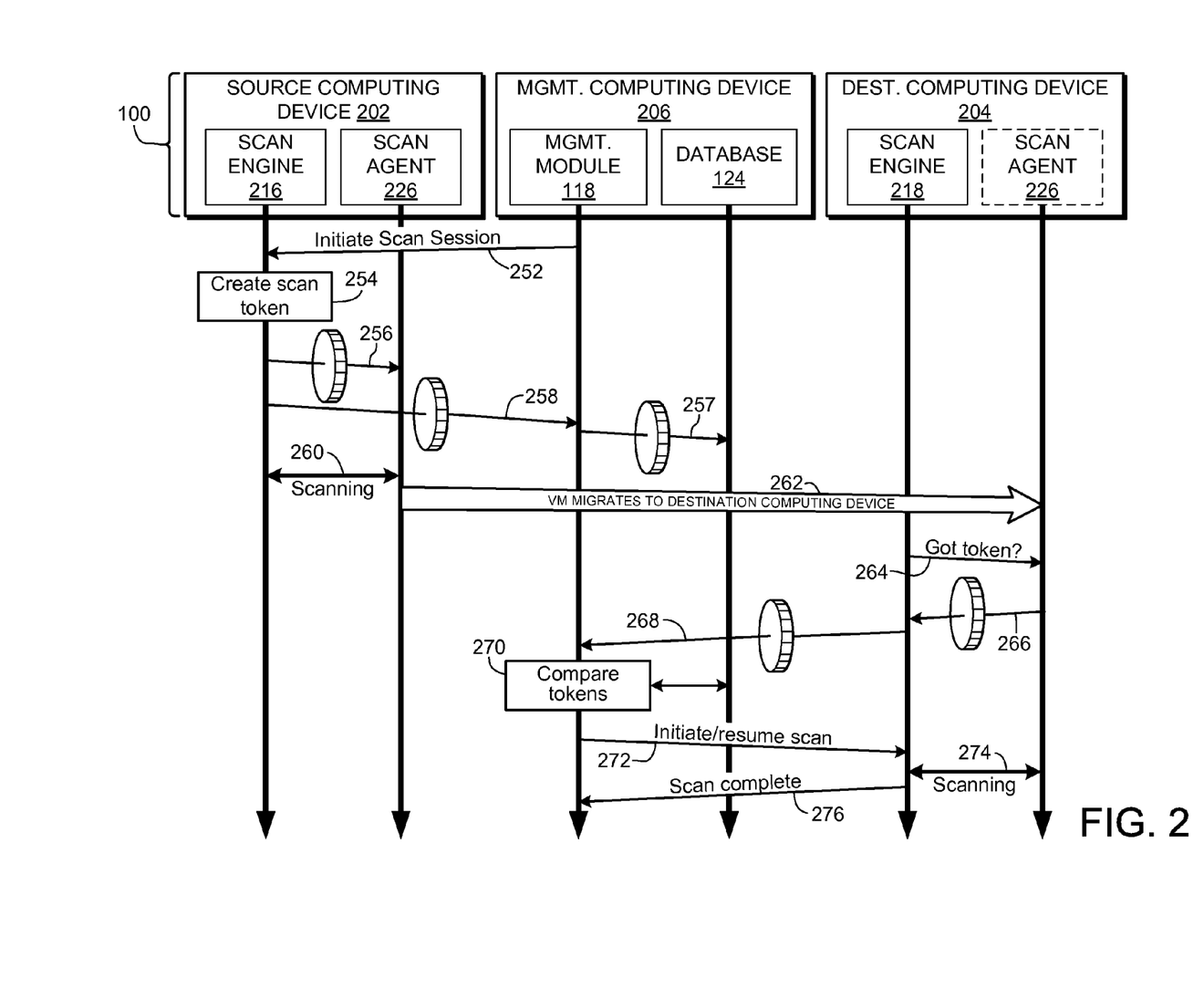
FIG. 2 shows a swim-lane diagram illustrating, by way of example, a migration of a VM during a scan session.

FIG. 2 shows a swim-lane diagram of scan system 100 that illustrates a migration of a VM during a scan session from source computing device 202 to destination computing device 204. In operation 252, management module 118 initiates a scan session by sending a message to scan engine 216 residing in source computing device 202. Scan engine 216 creates a scan token for each to be scanned in operation 254. Scan agent 226 belongs to one such VM (not separately shown), and in operation 256, a copy of the scan token created for that VM is transmitted to scan agent 226, which retains it during the course of the scan. In operation 258, a second copy of the scan token for the VM is transmitted to management module 118, which stores it in database 124 in operation 257. Management module 118 maintains an association between each scan token and the respective VM within database 124. In operation 260, scanning of files from the VM commences as previously described. During scanning, data from the VM is transmitted by scan agent 226 to the scan engine 216, which, in this embodiment, resides within the same physical computing device as the VM being scanned.

During scanning, a migration of the VM from source computing device 202 to destination computing device 204 occurs in operation 262. Although in the figure, operation 262 is illustrated with an arrow extending from the scan agent 226 on the source computing device to the scan agent 226 on the destination device, it should be understood that the VM migration may be completely transparent to the scan agent, and it is the scan agent itself, along with its copy of the token, which formerly resided with its VM on source computing device 202, which was transferred and now resides with its VM on destination computing device 204. When the VM is started on destination computing device 204, second scan engine 218, in operation 264, queries scan agent 226 (which is now on the destination computing device) to determine whether it has a scan token. The presence of a scan token within the transferred VM indicates the VM was undergoing a scan operation when it was migrated.

In this example, assume the scanning operation 260 was ongoing at the time of the migration operation 262. In this case, scan agent 226 still has its copy of the token and, in operation 266, provides it to scan engine 218 on the destination computing device 204. In operation 268, scan engine 218 transmits a copy of the scan token received from the migrated VM to management module 118 to determine whether the scan token is current (i.e., whether the scan token is associated with the current scan session). In operation 270, management module 118 determines whether the VM is in the list of VMs to be scanned, and compares the copy of scan token received in operation 268 with the copy of the scan token received in operation 258, which was stored in database 124. If the scan token copies match, then management module 118 determines the scan token received in operation 268 is current.

If management module 118 determines that the scan operation associated with the scan token received in operation 268 had completed, then no further scanning is performed on the VM for the current scan session. This can happen, for instance, if the VM is checkpointed during the initial scan, and then the VM is "rolled back" to that checkpoint after the scan completes. In this case, the roll-back would be to a point in time when the scan agent, which executes within the VM, retains a copy of the scan token during the scanning operation, and this scan token is deleted when the scanning operation completes, but restored when the VM is rolled back to a point in time during which the scan was ongoing.

However, if the scan operation had not completed when the VM was migrated, i.e., the scan tokens match in operation 270, and the scan token is associated with a current (incomplete) scan session, then management module 118, in operation 272, instructs scan engine 218 to resume the scan where it was left off. Scan engine 218 may query scan agent 226 to determine the point at which the scan operation was interrupted. (This operation is not depicted in FIG. 2.) For example, scan agent 226 may provide an identity of the file that was in the process of being scanned, or which file was scheduled to be scanned next. In another embodiment, this information may be supplied along with the scan token in operation 266. Scan engine 218 then resumes the scan where it was left off in the source computing device as shown at operation 274. When the scan operation is completed, scan engine 218 transmits a completion message 276 to management module 118 and may cause the scan token to be deleted from the VM and database 124 (not shown).

If the VM was suspended during the scanning operation 260, and then resumed at a later time, it is possible that a new scan is scheduled or needed for the VM. For example, suppose the scan being performed is for the presence of viruses and a virus signature database had been updated since the VM was suspended. In this case, the entire VM should be rescanned with the new signature database in order to identify new potential threats in the VM. In this case, at operation 270, the management module 118 may determine that the scan token received in operation 268 was stale, but a new scan is needed. In this case, an instruction 272 to scan engine 218 may be sent to initiate a new scan of the resumed VM. It should therefore be understood that, although various operations of the method described in FIG. 2 are presented with respect to a use case wherein a VM is transferred from a source to a destination computing device, the method has applicability in determining a proper course of action in other scenarios, such as a roll-back to a prior check-pointed or snapshotted state, or a suspend-and-resume, whether the restart or resume is on the same or a different computing device.

Previously described are two scenarios that may be faced by management module 118 when presented with a scan token for a restarted or migrated VM. In the first scenario, the VM was snapshotted at a point in time when it was undergoing a scan operation from a prior (i.e., not the current) scan session. In the second scenario, the VM was snapshotted at a point in time when the current scan session was underway. These scenarios are handled by the management module and scan engine as described in more detail below with reference to FIG. 3.

Figure 3:
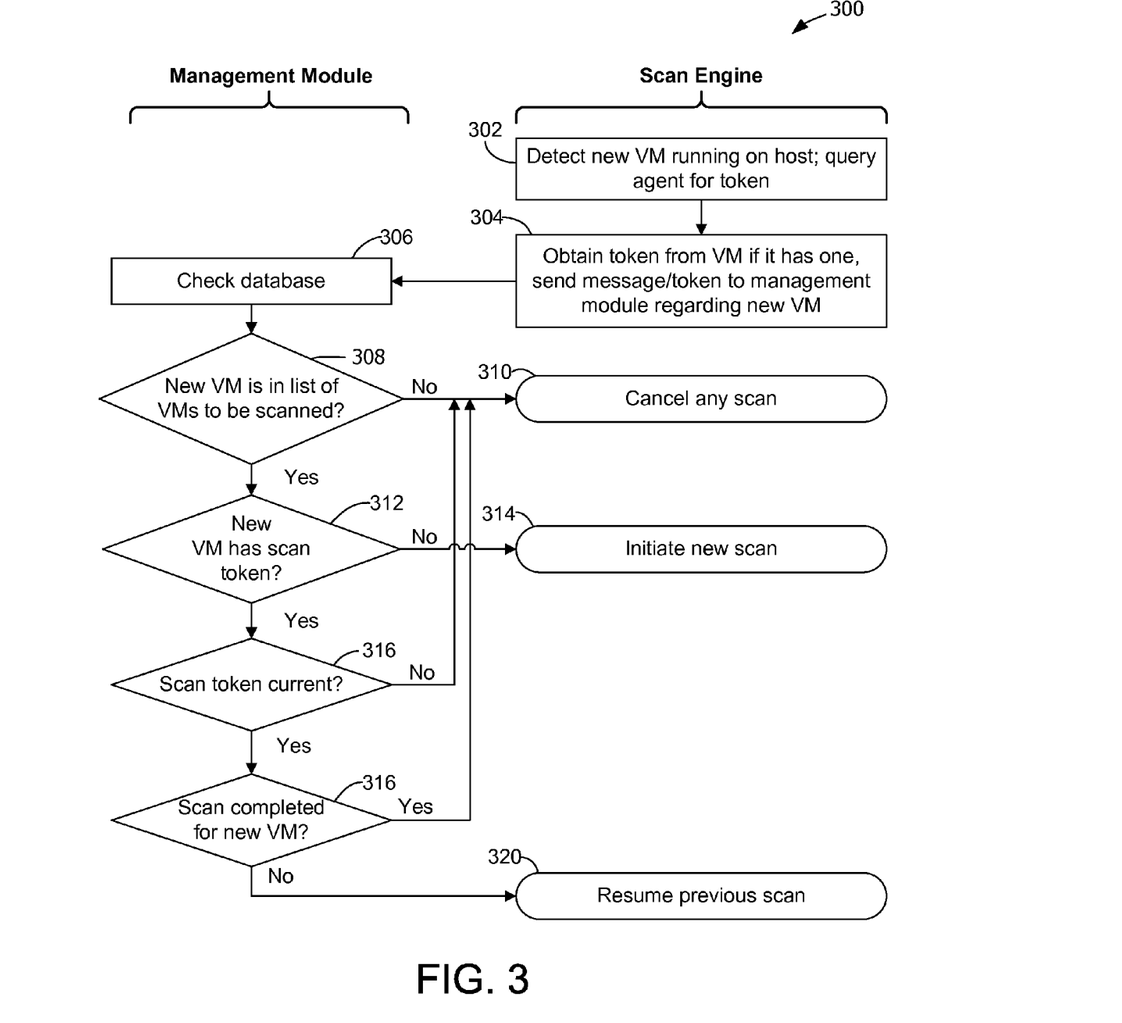
FIG. 3 is a block diagram of another exemplary scan system that illustrates a virtual machine resuming execution during a scan session.

FIG. 3 shows a flow chart 300 that illustrates by way of example a procedure in more detail for handling the various scenarios. Although these operations are described as taking place in either the management module or the scan engine, it should be noted that logic for carrying out these operations may be implemented in any convenient software component.

In operation 302, a new VM is detected running in the host. In one embodiment, when the VM is started, a signal is sent (or flag raised, or other triggering means) from the hypervisor to the scan engine, which runs outside the context of the target VMs, i.e., the VMs on which scanning operations are to be performed. The scan engine may run inside a special "security VM," which operates like any other VM on the host except that has security applications configured for performing scan operations on files or other data received from other VMs on the host. The signal to the scan engine may include an identity of the VM and/or other information necessary for communicating with the VM's scan agent. In response to detecting a new VM running on the host, the scan engine, in operation 304, queries the new VM for any scan token it may currently have. If the new VM has a scan token, then that means a scan operation was ongoing at the time it was suspended or snapshotted, etc., and it was resumed on the current host in the midst of the ongoing scan operation. The scan engine then sends a message to the management module, indicating the presence and identity of the new VM, the message including any scan token received from the new VM, indicating the presence of the VM to the management module. In another embodiment, the scan engine may simply inform the management module of a change in VMs on the host, the management module then queries the scan engine for specific information as needed by the management module.

In operation 306, the management module checks its database for any record of the VM and/or a corresponding copy of the scan token (if one was received from the scan engine). The database information is used for carrying out operations 308, 312, 316, and 318.

In operation 308, the management module determines whether the identity of the new VM is included in a list of VMs to be scanned. If not, then a message is sent to the scan engine to cancel any scan for the new VM. The scan engine can then send a message to the scan agent within the VM to cancel its scan. If the new VM is included in a list of VMs to be scanned, then the procedure flows to operation 312.

In operation 312, the management module determines whether the VM has a scan token, i.e., if one was received from the scan engine. (In the alternate embodiment, the scan engine is queried for the scan token rather than having the scan token "pushed" to the management module.) If there is no scan token, then the management module, in operation 314, sends an instruction to the scan engine to initiate a new scan of the new VM. If the VM had a scan token when it was resumed/rolled back, etc., on the host, then the procedure flows to operation 316.

In operation 316, the management module consults the database to determine if the scan token received from the new VM is current. In the first scenario described above, the snapshotted state of the VM includes a scan token associated with a prior scan session. If the VM is rolled back to the snapshotted state and resumes operation when a new, current, scan session is in progress, the prior scan token present in the rolled-back state will not match the scan token associated with the VM in database 124, as only the scan tokens generated for the current scan session are stored in the database (or expired tokens are marked as such). In operation 316, the management module compares the scan token received from the rolled back VM with the with scan token stored in the database the new VM. When the tokens do not match, management module 118 determines that the scan token from the rolled-back VM is obsolete and that the prior scan operation should not be resumed. The procedure flows to operation 310 wherein the ongoing scan session from the VM is canceled as previously described. In this instance, the management module, depending on implementation or configuration details, may initiate a new scan for the current scan session. As suggested above, such a new scan may be prudent if the scan is for viruses, malware, or other unwanted data or programs, and the signatures to be scanned against were updated since the prior scan session.

In the second scenario mentioned above, the snapshotted state of the VM includes a scan token associated with the current scan session. This can occur during a live migration such as the migration depicted in FIG. 2, the new VM is suspended and shortly thereafter resumed, or otherwise where the scan operation on the VM is in progress when it is rolled back to the snapshotted state. In this scenario, the scan token present within restarted or migrated VM will match the scan token in database 124. In response to determining that the scan tokens match, the procedure flows to operation 316 wherein the management module determines whether the VM completed the scan operation (for instance, prior to rolling back to a snapshotted state). If so, then the procedure flows to operation 310 to cancel the previous scan operation, and if not then the procedure flows to operation 320 wherein the scan operation is resumed at the point of the scan at which the new VM was previously suspended (or migrated).

In one embodiment, the scan engine 218 may not need to know the progress of the scan operation at the time it is resumed or restarted. Rather, scan agent 226 may be solely responsible for tracking scan progress. In another embodiment, scan engine 218 may query scan agent 226 (this operation is not depicted in FIG. 2) or be provided with the scan progress along with the scan token to determine progress of the scan. Scan agent 226 tracks scan progress and indicates the current point of the scan, for example, by identifying a file or point at which the scan operation should be resumed. Scan engine 120 and scan agent 226 resume the scan operation at the identified file or point.

It should be noted that each scan may be defined in part by a scope, which defines the disk drives or volumes, directories, or individual files to be scanned. In a Linux or Windows system, for example, the scope may be defined by a list of paths to directories that contain files and other directories (with files) to be scanned. This scope can be expanded to just a list of files by the scan engine and/or scan agent. A configuration or scan parameter may include how many files to be scanned concurrently. As each file is scanned, the scan agent marks the file in its list as "in progress" or the like, and it (or other component) spawns a thread to access the file, which then opens the file using operating system APIs. Referring for the moment to FIG. 2, scan agent 226 intercepts the file access request and passes the contents of the file to scan engine 218. Scan engine 218 scans the file contents and upon completion of the scan sends a "complete" message to scan agent 226, which then clears the "in progress" marking, and removes the file from the list or otherwise marks the scanned file as complete. If the scan engine identifies a threat in a particular file, it may send an instruction to scan agent 226 to quarantine or delete the file and/or send an alert to management module 118.

In one use case, a VM may be "powered on" within a host computing device while a scan session is being performed by management module 118 and scan engine 120. For example, second VM 408 may be powered on or instantiated by a user or an administrator after the scan session was initiated. In one embodiment, the scan agent does not persist the scan token to disk; therefore a VM that is powered-on will not have a scan token, whether or not the power-on follows a graceful power-off or not. When the scan engine detects a power-on event, the scan engine 120 and/or management module 118 checks the list of VMs to be scanned. If the VM is included in the list, then a new scan operation is initiated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, it should be recognized that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for scanning a virtual machine (VM) running on a host computer, the method comprising:
    upon a restarting of the VM or a completion of a migration operation of the VM, determining whether the VM has a scan token stored within a context of the VM, the scan token containing a value associated with an ongoing scan operation for the VM at a time of suspension or migration of the VM;
    when it is determined that the VM has the scan token, determining whether a corresponding scan token for the VM is present and current in a storage location outside the context of the VM;
    causing the ongoing scan operation to resume when the corresponding scan token is present and current in the storage location;
    causing the ongoing scan operation to be canceled when it is determined that the corresponding scan token is not present, or if the corresponding scan token is present, that the corresponding scan token is not current; and
    determining from information contained in the storage location regarding the corresponding scan token that the ongoing scan operation completed prior to a rollback and the restarting of the VM, and in response to the determining that the scan operation completed, canceling the ongoing scan operation.

2. The method of claim 1, wherein:
    upon initiation of a scan operation of the VM, the scan token associated with the scan operation is generated and stored within the context of the VM, and a copy of the scan token, which is the corresponding scan token, is stored in the storage location;
    the storage location is accessible by a management module, the management module executing outside the context of the VM, the management module maintaining an association between an identity of the VM and the scan token and performing the causing of the ongoing scan operation to be resumed or canceled.

3. The method of claim 1, wherein the VM was migrated to the host computer from a source host computer, the resuming of the ongoing scan operation on the host computer being a resumption of a scan operation that initiated on the source host computer.

4. The method of claim 1, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

5. A method for scanning a virtual machine (VM) running on a host computer, the method comprising:
    upon a restarting of the VM or a completion of a migration operation of the VM, determining whether the VM has a scan token stored within a context of the VM, wherein the determining as to whether the VM includes a scan comprises requesting the scan token from a scan agent executing within the VM, the scan agent having received and stored the scan token when the ongoing scan operation was initiated, the scan token containing a value associated with an ongoing scan operation for the VM at a time of suspension or migration of the VM;
    when it is determined that the VM has the scan token, determining whether a corresponding scan token for the VM is present and current in a storage location outside the context of the VM;
    causing the ongoing scan operation to resume when the corresponding scan token is present and current in the storage location;
    causing the ongoing scan operation to be canceled when it is determined that the corresponding scan token is not present, or if the corresponding scan token is present, that the corresponding scan token is not current; and
    determining from information contained in the storage location regarding the corresponding scan token that the ongoing scan operation completed prior to a rollback and the restarting of the VM, and in response to the determining that the scan operation completed, canceling the ongoing scan operation.

6. The method of claim 5, wherein:
    upon initiation of a scan operation of the VM, the scan token associated with the scan operation is generated and stored within the context of the VM, and a copy of the scan token, which is the corresponding scan token, is stored in the storage location;
    the storage location is accessible by a management module, the management module executing outside the context of the VM, the management module maintaining an association between an identity of the VM and the scan token and performing the causing of the ongoing scan operation to be resumed or canceled.

7. The method of claim 5, wherein the VM was migrated to the host computer from a source host computer, the resuming of the ongoing scan operation on the host computer being a resumption of a scan operation that initiated on the source host computer.

8. The method of claim 5, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

9. A non-transitory computer readable storage medium having stored thereon computer software executable by a processor of a host system, the computer software embodying a method for scanning a virtual machine (VM) running on a host computer, the method comprising:
    upon a restarting of the VM or a completion of a migration operation of the VM, determining whether the VM has a scan token stored within a context of the VM, the scan token containing a value associated with an ongoing scan operation for the VM at a time of suspension or migration of the VM;

when it is determined that the VM has the scan token, determining whether a corresponding scan token for the VM is present and current in a storage location outside the context of the VM;

causing the ongoing scan operation to resume when the corresponding scan token is present and current in the storage location;

causing the ongoing scan operation to be canceled when it is determined that the corresponding scan token is not present, or if the corresponding scan token is present, that the corresponding scan token is not current; and determining from information contained in the storage location regarding the corresponding scan token that the ongoing scan operation completed prior to a rollback and the restarting of the VM, and in response to the determining that the scan operation completed, canceling the ongoing scan operation.

10. The non-transitory computer readable storage medium of claim 9, wherein:

upon initiation of a scan operation of the VM, the scan token associated with the scan operation is generated and stored within the context of the VM, and a copy of the scan token, which is the corresponding scan token, is stored in the storage location;

the storage location is accessible by a management module, the management module executing outside the context of the VM, the management module maintaining an association between an identity of the VM and the scan token and performing the causing of the ongoing scan operation to be resumed or canceled.

11. The non-transitory computer readable storage medium of claim 9, wherein the VM was migrated to the host computer from a source host computer, the resuming of the ongoing scan operation on the host computer being a resumption of a scan operation that initiated on the source host computer.

12. The non-transitory computer readable storage medium of claim 9, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

13. A host system comprising:

a processor; and a non-transitory computer readable medium having stored thereon instructions that, when executed by the processor, causes the processor to perform a method for scanning a virtual machine (VM) running on a host computer, the method comprising:

upon a restarting of the VM or a completion of a migration operation of the VM, determining whether the VM has a scan token stored within a context of the VM, the scan token containing a value associated with an ongoing scan operation for the VM at a time of suspension or migration of the VM;

when it is determined that the VM has the scan token, determining whether a corresponding scan token for the VM is present and current in a storage location outside the context of the VM;

causing the ongoing scan operation to resume when the corresponding scan token is present and current in the storage location;

causing the ongoing scan operation to be canceled when it is determined that the corresponding scan token is not present, or if the corresponding scan token is present, that the corresponding scan token is not current; and determining from information contained in the storage location regarding the corresponding scan token that the ongoing scan operation completed prior to a rollback and the restarting of the VM, and in response to the determining that the scan operation completed, canceling the ongoing scan operation.

14. The host system of claim 13, wherein:

upon initiation of a scan operation of the VM, the scan token associated with the scan operation is generated and stored within the context of the VM, and a copy of the scan token, which is the corresponding scan token, is stored in the storage location;

the storage location is accessible by a management module, the management module executing outside the context of the VM, the management module maintaining an association between an identity of the VM and the scan token and performing the causing of the ongoing scan operation to be resumed or canceled.

15. The host system of claim 13, wherein the VM was migrated to the host computer from a source host computer, the resuming of the ongoing scan operation on the host computer being a resumption of a scan operation that initiated on the source host computer.

16. The host system of claim 13, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

17. A non-transitory computer readable storage medium having stored thereon computer software executable by a processor of a host system, the computer software embodying a method for scanning a virtual machine (VM) running on a host computer, the method comprising:

upon a restarting of the VM or a completion of a migration operation of the VM, determining whether the VM has a scan token stored within a context of the VM, wherein the determining as to whether the VM includes a scan comprises requesting the scan token from a scan agent executing within the VM, the scan agent having received and stored the scan token when the ongoing scan operation was initiated, the scan token containing a value associated with an ongoing scan operation for the VM at a time of suspension or migration of the VM;

when it is determined that the VM has the scan token, determining whether a corresponding scan token for the VM is present and current in a storage location outside the context of the VM;

causing the ongoing scan operation to resume when the corresponding scan token is present and current in the storage location;

causing the ongoing scan operation to be canceled when it is determined that the corresponding scan token is not present, or if the corresponding scan token is present, that the corresponding scan token is not current; and determining from information contained in the storage location regarding the corresponding scan token that the ongoing scan operation completed prior to a rollback and the restarting of the VM, and in response to the determining that the scan operation completed, canceling the ongoing scan operation.

18. The non-transitory computer readable storage medium of claim 17, wherein:
upon initiation of a scan operation of the VM, the scan token associated with the scan operation is generated and stored within the context of the VM, and a copy of the scan token, which is the corresponding scan token, is stored in the storage location;
the storage location is accessible by a management module, the management module executing outside the context of the VM, the management module maintaining an association between an identity of the VM and the scan token and performing the causing of the ongoing scan operation to be resumed or canceled.

19. The non-transitory computer readable storage medium of claim 17, wherein the VM was migrated to the host computer from a source host computer, the resuming of the ongoing scan operation on the host computer being a resumption of a scan operation that initiated on the source host computer.

20. The non-transitory computer readable storage medium of claim 17, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

21. A host system comprising:
a processor; and
a non-transitory computer readable medium having stored thereon instructions that, when executed by the processor, causes the processor to perform a method for scanning a virtual machine (VM) running on a host computer, the method comprising:
upon a restarting of the VM or a completion of a migration operation of the VM, determining whether the VM has a scan token stored within a context of the VM, wherein the determining as to whether the VM includes a scan comprises requesting the scan token from a scan agent executing within the VM, the scan agent having received and stored the scan token when the ongoing scan operation was initiated, the scan token containing a value associated with an ongoing scan operation for the VM at a time of suspension or migration of the VM;
when it is determined that the VM has the scan token, determining whether a corresponding scan token for the VM is present and current in a storage location outside the context of the VM;
causing the ongoing scan operation to resume when the corresponding scan token is present and current in the storage location;
causing the ongoing scan operation to be canceled when it is determined that the corresponding scan token is not present, or if the corresponding scan token is present, that the corresponding scan token is not current; and
determining from information contained in the storage location regarding the corresponding scan token that the ongoing scan operation completed prior to a rollback and the restarting of the VM, and in response to the determining that the scan operation completed, canceling the ongoing scan operation.

22. The host system of claim 21, wherein:
upon initiation of a scan operation of the VM, the scan token associated with the scan operation is generated and stored within the context of the VM, and a copy of the scan token, which is the corresponding scan token, is stored in the storage location;
the storage location is accessible by a management module, the management module executing outside the context of the VM, the management module maintaining an association between an identity of the VM and the scan token and performing the causing of the ongoing scan operation to be resumed or canceled.

23. The host system of claim 21, wherein the VM was migrated to the host computer from a source host computer, the resuming of the ongoing scan operation on the host computer being a resumption of a scan operation that initiated on the source host computer.

24. The host system of claim 21, wherein the VM was restarted on the host computer after having been previously suspended on the host computer, the resuming of the ongoing scan operation on the host computer being a resumption of a scan operation that initiated prior to the suspension of the VM, the suspending of the VM being one of a pause in VM execution by virtualization software running on the host computer, a sleep, a hibernation, a power down, or a system fault.

* * * * *